United States Patent [19]

Boschen et al.

[11] 4,051,035
[45] Sept. 27, 1977

[54] APPARATUS FOR THE AEROBIC TREATMENT OF LIQUID WASTE

[75] Inventors: William O. Boschen, Cliffside Park; Angelo V. Annichiarico, East Hanover; Arthur L. Johnson, Lodi, all of N.J.

[73] Assignee: Ralph B. Carter Company, Hackensack, N.J.

[21] Appl. No.: 714,849

[22] Filed: Aug. 16, 1976

[51] Int. Cl.² ............................ C02C 1/12; B01F 3/04
[52] U.S. Cl. ...................................... 210/220; 261/77; 261/124
[58] Field of Search ....................... 138/106, 107, 108; 210/14, 15, 63 R, 220, 221 R; 248/68 R, 68 CB; 261/77, 123, 124, 121 R

[56] References Cited

U.S. PATENT DOCUMENTS

| 399,200 | 3/1889 | Kaehler | 261/77 |
|---|---|---|---|
| 1,116,308 | 11/1914 | MacDonald | 261/77 |
| 2,024,986 | 12/1935 | Durdin, Jr. | 210/15 X |
| 3,148,509 | 9/1964 | Laurie | 261/123 X |
| 3,188,030 | 6/1965 | Fischer | 248/68 CB |
| 3,423,113 | 1/1969 | Gonsalves et al. | 248/68 R X |
| 3,452,966 | 7/1969 | Smolski | 261/77 |
| 3,672,647 | 6/1972 | Murphy et al. | 261/121 R |
| 3,852,384 | 12/1974 | Bearden | 261/120 X |
| 3,931,370 | 1/1976 | Murphy | 261/77 |
| 3,968,086 | 7/1976 | Romanowski | 261/77 |
| 3,969,446 | 7/1976 | Franklin, Jr. | 261/77 X |

Primary Examiner—Wilbur L. Bascomb, Jr.
Assistant Examiner—Robert H. Spitzer
Attorney, Agent, or Firm—Samuelson & Jacob

[57] ABSTRACT

A plurality of support brackets are placed within a basin of a system for the aerobic treatment of liquid waste materials and are arranged in a pattern beneath continuous lines in a gas distribution line array, the lines being attached to the brackets, and mixer-aerator devices are capable of ready attachment to the brackets to enable selective location of a mixer-aerator devices over orifices placed in the line array at the brackets, or ready detachment from the brackets to enable selective removal of the mixer-aerator devices without disturbing the attachment of the lines to the brackets, the balance within the gas distribution line array, or the ability of the system to continue to operate, despite the removal of some mixer-aerator devices, without further modification of the system.

24 Claims, 6 Drawing Figures

APPARATUS FOR THE AEROBIC TREATMENT OF LIQUID WASTE

The present invention relates to aerobic waste treatment apparatus and in particular to apparatus for mixing and aerating liquid waste prior to delivering the same for further processing. More particularly, the invention is directed toward providing ready installation and removal of mixer-aerator devices, such as those known commonly as "submerged static aerators", in the system through means for readily connecting and disconnecting the mixer-aerator devices to the gas distribution lines of pipes of such apparatus without disturbing the balance of the system.

A plurality of gas distributing lines or pipes for supplying a gas such as air are laid along the bed of a treatment basin in the most desirable configuration for that particular waste treatment plant. Usually, the distribution lines are laid in straight, parallel lines and are supplied with gas from a manifold or header which usually is positioned transverse to the distribution lines. However, any suitable configuration may be used with both the prior art systems and the improved system of the instant invention.

The distribution lines are provided with orifices therein which are spaced apart, and usually there is a mixer-aerator device placed over each of the orifices. Thus, the gas is emitted from the orifice and the bubbles proceed upward through the mixer-aerator device to transfer a maximum amount of oxygen to the liquid. The oxygen is important to the aerobic process since the aerobic bacteria require it in order for them to act on the suspended and dissolved solids in the liquid being treated.

The mixer-aerator device serves another primary function, namely, to thoroughly mix the liquid in the treatment basin by shear techniques and other means in order to assist in the maximization of the transfer of the oxygen to the liquid in order to improve the action of the bacteria on the dissolved and suspended solids. It is important that the solids do not settle to any appreciable extent in the basin in which the mixing and aeration take place but that the settling of the solids, generally referred to as sludge, should take place downstream from the mixing-aerating basin in, for example, a settling tank.

The prior art devices, which were of two general types, possessed inherent disadvantages. The first type required that each of the mixer-aerator devices be installed individually on its base and then the gas distribution lines were connected to the mixer-aerator device. This resulted in very high installation and construction costs and an even more expensive operating procedure because it was impossible to disconnect a particular mixer-aerator device without disturbing the gas distribution pattern and, consequently, the continuity and balance of the system. Operating flexibility was limited and future expansion could not be accomplished easily.

In the second type the mixer-aerator device was pivotally connected to its base and did not maintain a rigidly fixed position with respect to the liquid in the bed and, as a consequence, there was some loss in mixing-aerating efficiency during operation, as well as difficulty during installation in empty basins with consequent damage and other deleterious effects.

Other prior art devices endeavored to keep the top of the mixer-aerator device close to the liquid surface. It has been found, however, that improved aerobic action occurs if the top of the mixer-aerator device is considerably below the upper surface of the liquid in the basin. The construction of the present invention lends itself, ideally, to such operation.

Broadly, the construction of the present invention permits the gas distribution pipes or lines to be laid on the bed of the basin, connected to all the bases, and especially to those at which a mixer-aerator device is expected to be installed, and to have the gas discharge orifice drilled on the site at least at each base where a mixer-aerator is to be installed.

This is accomplished by installing a support bracket having the novel construction of the invention rigidly to the base, platform or footing. The support bracket of the invention may be set in a concrete base or it may be spiked or otherwise affixed thereto as will be made apparent during the course of this description. The support bracket is provided with means for attaching distribution lines or pipes of various sizes in fixed position and is provided with receptor means for receiving legs, which may be either integral or unitary with the mixer-aerator device, and holding the mixer-aerator device rigidly in position. Where no mixer-aerator device is attached to a support bracket, that particular support bracket and base will serve merely as a sinker to maintain the attached distribution line in place within the array of lines within the system.

Because of the unique construction of the invention, any one or a number of mixer-aerator devices may be removed from the system without the use of special tools and without affecting the operation of the remainder of the system.

Moreover, the orifice in the gas distribution line associated with a particular mixer-aerator device may be left open when the mixer-aerator device is removed or it may be plugged. The decision with respect to which procedure should be followed will be dictated by the requirements of the particular aerobic treatment system and such other parameters as may be significant at the time.

It is an important object of the invention to provide a construction for use in aerobic waste treatment systems which is efficient and economical to install and remove.

Another object of the invention is to provide a support bracket for holding the gas distribution line or pipe in position and for holding a mixer-aerator device rigidly in its most desired position relative to the distribution line and an orifice therein.

Still another object of the invention is to provide a construction which permits the mixer-aerator devices to be installed and removed at selected locations by attachment to support brackets or detachment from support brackets without the use of special tools.

A further object of the invention is to provide a support bracket which may be affixed readily to a base or footing in a variety of ways and which, when so affixed, can be attached to a gas distribution line to serve merely as a sinker for maintaining the attached distribution line in place within the array of lines within the system, as well as a means for selectively attaching a mixer-aerator device in place over the gas distribution line.

A still further object of the invention is to provide a support bracket which may be used with gas distribution lines or pipes of various diameters such that changes in the size of a distribution line can be effected easily without necessitating replacement of the support bracket, or modification of the support bracket or a mixer-aerator device in order to enable the mixer-aerator device to function properly in conjunction with any of the lines of different sizes.

Yet another object of the invention is to provide a construction which enables ease of installation of the system by permitting the placement of the support brackets on bases in a pattern in the basin of the system, the attachment of continuous gas distribution lines to the support brackets at the locations of the support brackets, the provision of orifices in the gas distribution lines at all or at selected support bracket locations, as by drilling the distribution lines at those locations, and the subsequent rigid attachment of mixer-aerator devices to selected support brackets in position over the orifices provided at the selected locations in such a manner that any of the mixer-aerator devices can be removed or replaced with ease and without disrupting the continuity of the distribution line array and the operation of the remainder of the system.

The above objects, as well as still further objects and advantages, are attained by the present invention, which may be described briefly as providing an improvement in a system for the aerobic treatment of waste materials in a liquid basin, the system including gas distribution lines in an array of continuous lines having a plurality of orifices placed therein for releasing gas, such as air, to the liquid in the basin during operation of the system, and a mixer-aerator device for placement in position over any one of the orifices for enhancing the mixing and aerating of the liquid in the region adjacent that position, the improvement comprising a plurality of brackets capable of being placed within the basin in a pattern corresponding to the array of continuous lines, means for attaching the continuous lines to the brackets at spaced locations along the continuous lines without interrupting the continuity of the continuous lines, at least some of the locations corresponding to the placement of the orifices, selective means integral with each bracket and the mixer-aerator device for securing the mixer-aerator device upon a selected bracket in a rigid, self-supporting manner, over a line and the orifice placed at the location of the selectd bracket, the selective means being capable of ready operation for selectively securing the mixer-aerator device to the selected bracket and selectively removing the mixer-aerator device from the selected bracket, the selective means including: at least two rigid legs extending between the mixer-aerator device and the selected bracket, the legs each having opposite ends, a foot adjacent at least one of the opposite ends of each leg, receptor means for each foot, the location of the receptor means corresponding to the location of each foot when the mixer-aerator device is in place upon the selected bracket, and fastening means for selectively securing each foot with the corresponding receptor means in such manner as to preclude relative movement between the foot and the receptor means, the fastening means being capable of manual operation to release each foot from the corresponding receptor means without disturbing the attachment of the line to the selected bracket and the continuity of the array whereby selective securement and removal of the mixer-aerator device is accomplished readily without disturbing the operation of the system.

The invention will be more fully understood, while still further objects and advantages will be made apparent, in the following detailed description of embodiments of the invention illustrated in the accompanying drawing, in which.

Figure 1:
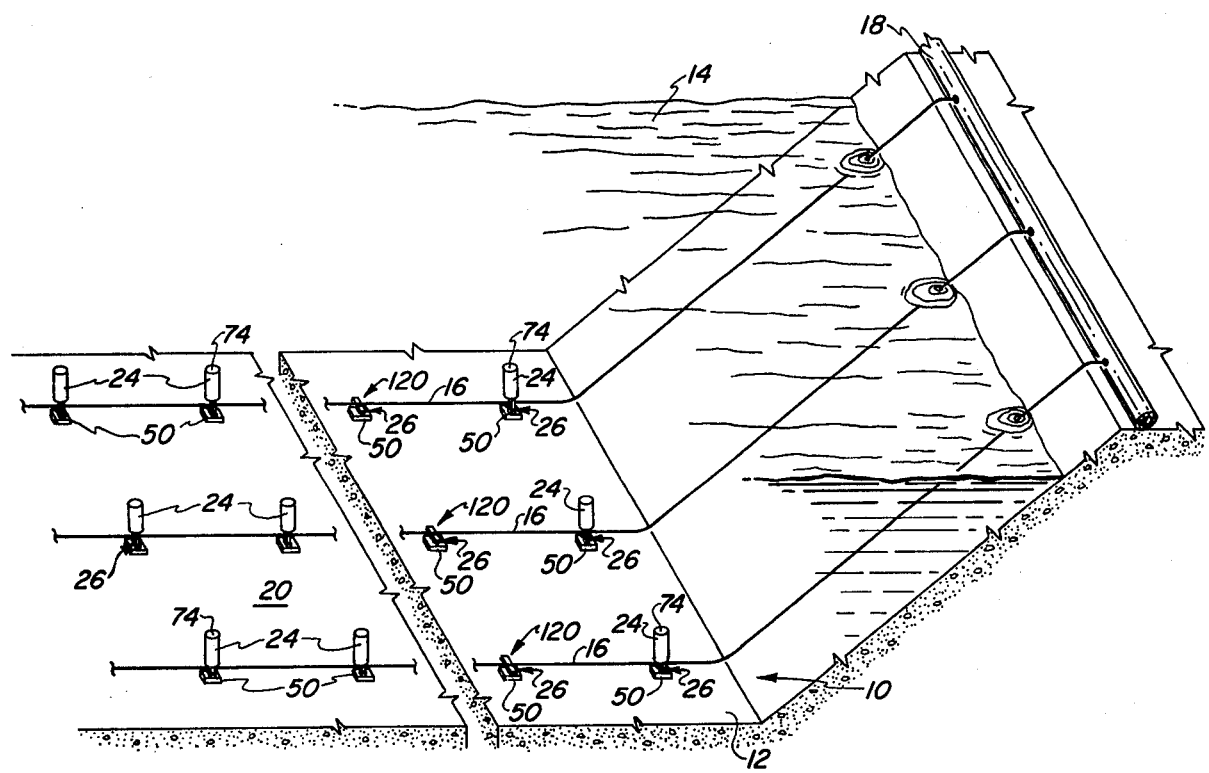
FIG. 1 is a pictorial view of a system for the aerobic treatment of waste materials in a liquid basin.

Referring now to the drawing, and especially to FIG. 1 thereof, a system for the aerobic treatment of waste materials is illustrated at 10 and is seen to be placed within a basin 12 containing liquid 14 carrying the waste material. Gas, such as air, is supplied to the liquid 14 in basin 12 by gas distribution lines including an array of lines in the form of lengths of pipe 16 connected to a common header 18, the lengths of pipe 16 extending longitudinally adjacent the bottom 20 of the basin 12. A plurality of orifices 22 (see FIG. 2) are placed in each pipe 16 for releasing the gas to the liquid. In order to enhance the mixing and aerating effect of the gas released into the liquid, mixer-aerator devices 24 are positioned over at least some of the orifices 22 and are secured in place well below the surface of the liquid 14.

Figure 3:
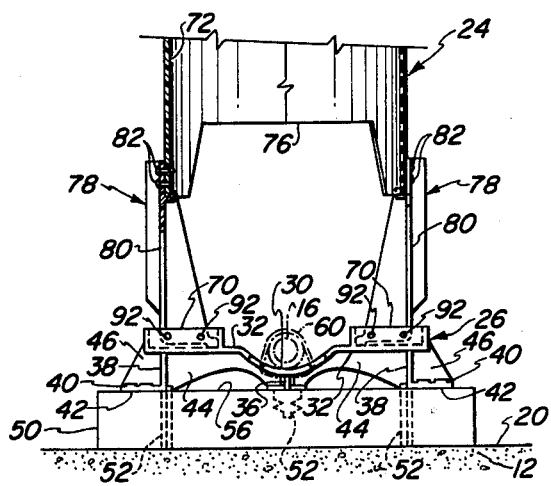
FIG. 3 is a front elevational view, reduced in size, of the portion of the system illustrated in FIG. 2, with the component parts assembled.
Figure 4:
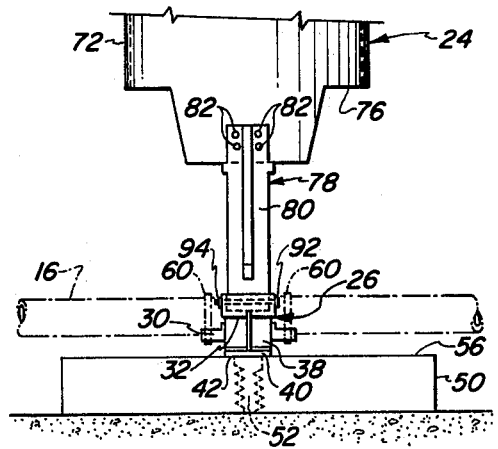
FIG. 4 is a side elevational view of the portion of the system shown in FIG. 3.
Figure 2:
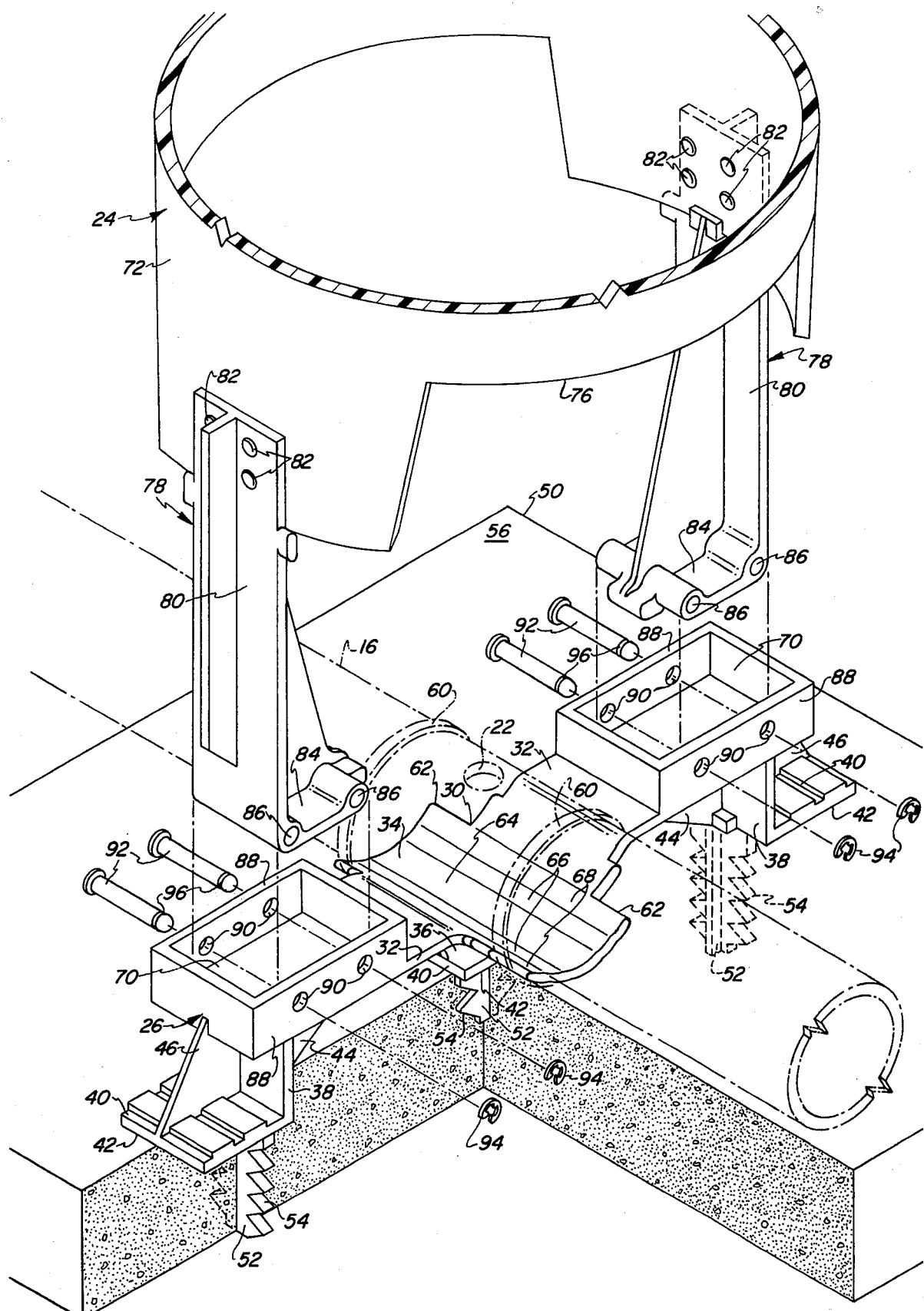
FIG. 2 is a partially sectioned, enlarged exploded isometric view of a portion of the system constructed in accordance with the invention.

Turning now to FIGS. 2 through 4, as well as to FIG. 1, the improvement of the present invention enables simplified installation of system 10 and increased flexibility in the operation of the system by the provision of a plurality of support brackets 26 having a construction which renders the brackets relatively easy to install, enables ease in the location and installation of lengths of pipe 16, and allows selective attachment of mixer-aerator devices 24 with appropriate rigidity at specified, selected locations.

Each bracket 26 has a platform 30 and a pair of arms 32, each arm 32 extending laterally outwardly in opposite directions from the platform 30 which includes a longitudinally extending upper surface 34. A plurality of depending supports, in the form of a central column 36 and end columns 38, extend downwardly, in an altitudinal direction, beneath the platform 30 and the arms 32. Each column 36 and 38 carries a locating shoulder 40 providing basal surfaces 42 upon which the bracket 26 rests when installed. Inner webs 44 extend between the columns 36 and 38, the arms 32 and platform 30, while outer webs 46 extend between the outer columns 38 and the arms 32 to reinforce the structure of bracket 26.

A plurality of brackets 26 are placed permanently within basin 12 by affixing each bracket 26 to a footing or base 50. The bases 50 and brackets 26 are placed in a pattern corresponding to the array of the lengths of pipe 16. Thus, where a base 50 is constructed of cast concrete, as illustrated in FIG. 2, each column 36 and 38 is provided with an anchoring projection 52 extending altitudinally downwardly beneath the locating shoulder 40 of each column. Projections 52 have toothed edges 54 for securely anchoring the bracket when projections 52 are embedded in the concrete of base 50. The basal surfaces 42 rest upon the upper surface 56 of base 50 and serve to locate the bracket 26 altitudinally relative to the base 50 so as to assist in the attainment of uniform elevation for the platforms 30 of the brackets 26.

Once the brackets 26 are in place within the bases 50, the lengths of pipe 16 are strung over the brackets 26 and rest upon the upper surface 34 of platform 30. Pipe attaching means in the form of clamping bands 60 are then installed around the lengths of pipe 16 and around longitudinally extending portions 62 of platform 30 to attach the lengths of pipe 16 to the platform. If the orifice 22 at that location has not already been provided prior to installation of the piping, on the brackets, the pipe 16 can be drilled or punched on the site after attachment to the bracket to provide the appropriate orifice 22. Thus, the lengths of pipe 16 are secured within the array in the basin without cutting or otherwise modifying the pipe in any way that would interrupt the continuity of the continuous lengths of pipe 16. Upper surface 34 of the platform 30 has a surface contour which includes a plurality of cylindrical segments 64, 66 and 68 of different radii in order to accommodate pipe of any one of a plurality of different diameters. In this manner, any one of a full range of pipe sizes can be installed initially using the same bracket 26. Additionally, a pipe may be removed and replaced with one of a different size without disturbing the installed bracket.

In order to secure a mixer-aerator device 24 over an orifice 22 at any location where a bracket 26 is installed, each bracket 26 is provided with receptor means in the form of a receptacle 70 adjacent the end of each arm 32. The mixer-aerator devices 24 each have a tubular body 72 with a top 74 (see FIG. 1) and an open bottom 76. A pair of rigid legs 78 are integral with the tubular body 72 and extend altitudinally downwardly at diametrically opposed locations on the body 72. In the embodiment of FIGS. 2 through 4, legs 78 include posts 80 which have been manufactured separate from the tubular body 72, but which are rigidly affixed to the tubular body by a plurality of rivets 82 to establish a rigid, integral structure. At the lowermost end of each leg 78 there is located a foot 84 having a configuration generally complementary to a corresponding receptacle 70 in the bracket 26.

Each foot 84 and bracket 26 is provided with selective means for securing a mixer-aerator device 24 to a selected bracket 26. In the preferred embodiment, each foot 84 has a pair of laterally spaced apart openings 86 passing through the foot in a direction parallel to the longitudinal direction in which the length of pipe 16 extends. Each receptacle 70 includes longitudinally spaced walls 88 having laterally spaced apertures 90 which will be aligned with openings 86 when the foot 84 is inserted into the receptacle 70 and walls 88 are juxtaposed with the foot. Fastening means in the form of pins 92 are then inserted through the aligned apertures 90 and openings 86 to secure each foot 84 in each corresponding receptacle 70 in such manner as to preclude relative movement between the foot and the receptacle, and hence between the legs 78 and the bracket 26. Pins 92 are retained in place within apertures 90 and openings 86 by retaining means preferably in the form of commercially available retainers such as snap rings 94 received within annular grooves 96 in the pins.

Figure 5:
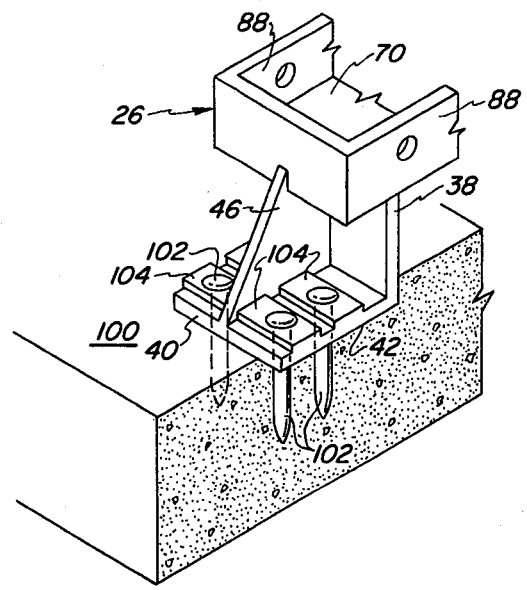
FIG. 5 is a fragmentary enlarged isometric view partially similar to FIG. 2, but showing an alternate embodiment of a component part constructed in accordance with the invention.

The snap rings 94 are capable of manual placement within grooves 96 and manual removal from the grooves 96 so that the selective installation of a mixer-aerator device 24 upon any selected bracket 26 or the selective removal of a mixer-aerator device 24 from a bracket 26 can be accomplished with ease and without the requirement for special tools. The number, orientation and location of pins 92, together with the reinforced structure of bracket 26, and the receptacles 70 thereon, provide a rigid, self-supporting attachment for the mixer-aerator device 24 at the location of the orifice 22. The complementary configurations of each foot 84 and its complementary receptacle 70 assure that no relative movement will take place between the foot and the receptacle, and consequently between the mixer-aerator device 24 and the bracket 26. The legs 78 straddle the length of pipe 16 at the location of the orifice 22 to place the mixer-aerator device 24 in appropriate position to enhance mixing and aerating of the liquid by the gas emanating from the orifice 22. Furthermore, installation and removal of any mixer-aerator device 24 can be accomplished at any time without disturbing the continuity of the piping array or the attachment of the lengths of pipe to the brackets. The gas supply to the orifices 22 at all locations remains undisturbed by the removal of a mixer-aerator device 24 at any location and system balance is maintained.

Where it may not be practical to install a bracket 26 with an anchoring projection 52 embedded in a base 50, the anchoring projections 52 may be deleted from each support column 36 and 38, as seen in FIG. 5. The bracket 26 may then be located upon a mounting surface 100 by the basal surfaces 42 and secured by fasteners, such as spikes 102, driven through built-up portions 104 of the locating shoulders 40. Other fasteners, such as screws or threaded studs with nuts, may be employed depending upon the nature, material and location of the mounting surface 100.

The tubular body 72 of the mixer-aerator device 24 usually is fabricated of a synthetic resin material. While the preferred material for the posts 80 and brackets 26 also is a synthetic resin, the ability to fabricate these components separate from the tubular body 72 enables a wider choice of materials. Pins 92 also may be made of a synthetic resin material chosen from those materials exhibiting good strength with a high resistance to the corrosive effects of the liquid 14 in the basin 12.

Figure 6:
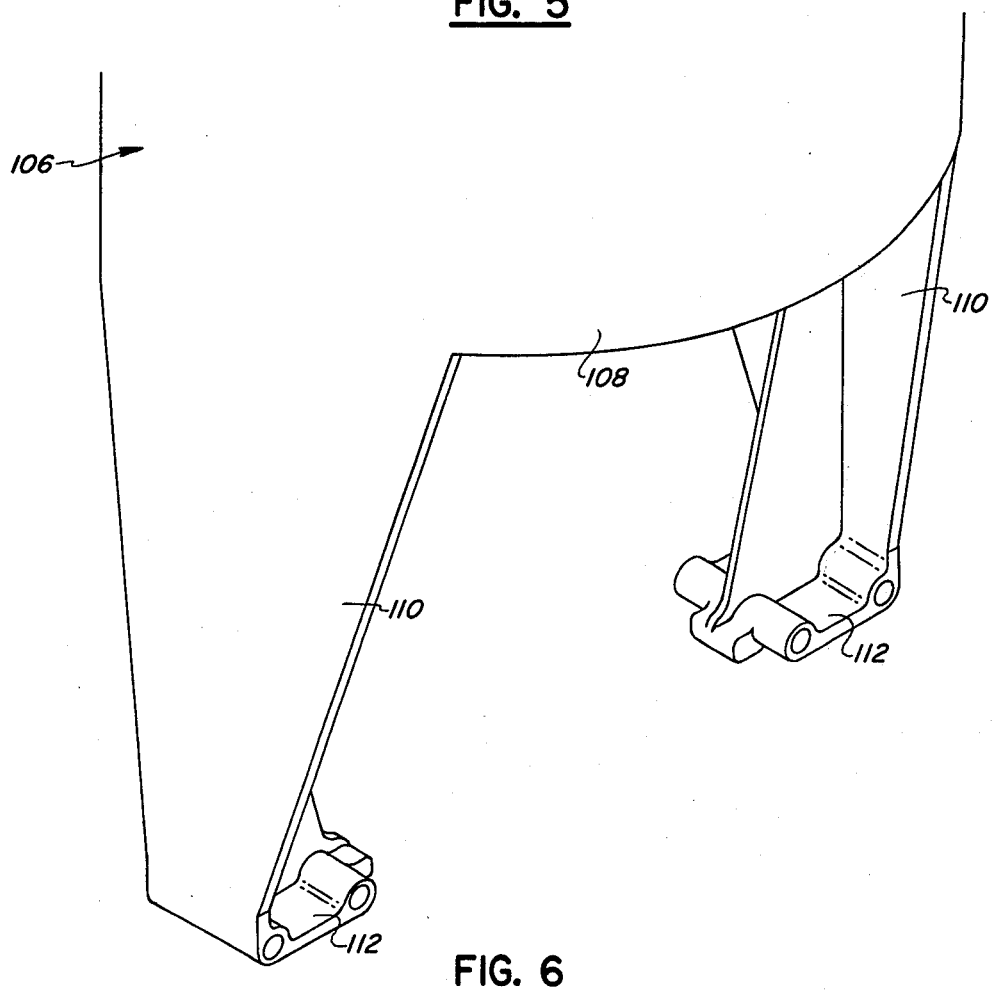
FIG. 6 is a fragmentary enlarged isometric view partially similar to FIG. 2, but showing an alternate embodiment of another component part constructed in accordance with the invention.

When the tubular body 72 of the mixer-aerator device 24 and the depending legs 78 can be fabricated of the same synthetic resin material, it would be practical to fabricate a unitary structure by molding. As seen in FIG. 6, an alternate mixer-aerator device 106 has a tubular body 108 and depending legs 110 unitary with the tubular body 108. A foot 112 is unitary with each leg 110 and has a configuration identical with foot 84 of the mixer-aerator device 24 described above. Thus, mixer-aerator device 106 may be attached and secured to any selected bracket 26 in the same manner as described in connection with the installation of mixer-aerator devices 24.

Where no mixer-aerator device is attached to a bracket 26, as seen at 120 in FIG. 1, the bracket 26 and base 50 serve as a sinker at each such location to maintain the attached pipe 16 in place within the array of pipes in the system 10. Thus, bracket 26 serves the dual capacity of providing for the positive location and maintenance of the gas distribution lines in appropriate alignment within the gas distribution line array as well as an attachment point for the selective securement of a mixer-aerator device 24. Since all of the brackets 26 can have the same construction, whether employed as attachments for mixer-aerator devices or merely as sinkers, both economy and flexibility are achieved.

It is to be understood that the above detailed description of preferred embodiments of the invention is provided by way of example only. Various details of design and construction may be modified without departing from the true spirit and scope of the invention as set forth in the appended claims.

The embodiments of the invention in which an exclusive property or privilege is claimed are defined as follows:

1. In a system for the aerobic treatment of waste materials in a liquid basin, the system including gas distribution lines in an array of continuous lines having a plurality of orifices placed therein for releasing gas, such as air, to the liquid in the basin during operation of the system, and a mixer-aerator device for placement in position over any one of the orifices for enhancing the mixing and aerating of the liquid in the region adjacent that position, the improvement comprising:

a plurality of brackets capable of being placed within the basin in a pattern corresponding to the array of continuous lines;

means for attaching the continuous lines to the brackets at spaced locations along the continuous lines without interrupting the continuity of the continuous lines, at least some of the locations corresponding to the placement of the orifices;

selective means integral with each bracket and the mixer-aerator device for securing the mixer-aerator device upon a selected bracket in a rigid, self-supporting manner, over a line and the orifice placed at the location of the selected bracket, the selective means being capable of ready operation for selectively securing the mixer-aerator device to the selected bracket and selectively removing the mixer-aerator device from the selected bracket, said selective means including:

at least two rigid legs extending between the mixer-aerator device and the selected bracket, the legs each having opposite ends;

a foot adjacent at least one of the opposite ends of each leg;

receptor means for each foot, the location of the receptor means corresponding to the location of each foot when the mixer-aerator device is in place upon the selected bracket; and fastening means for selectively securing each foot with the corresponding receptor means in such manner as to preclude relative movement between the foot and the receptor means, said fastening means being capable of manual operation to release each foot from the corresponding receptor means without disturbing the attachment of the line to the selected bracket and the continuity of the array whereby selective securement and removal of the mixer-aerator device is accomplished readily without disturbing the operation of the system.

2. The invention of claim 1 wherein the mixer-aerator device includes a tubular body having a top and an open bottom and wherein:

the rigid legs depend from the bottom of the tubular body and are rigidly integral therewith at the uppermost of the opposite ends, the legs being spaced apart laterally so as to enable the legs to straddle the line at the location of the selected bracket;

each foot is adjacent the lowermost end of each leg; and the receptor means includes a receptacle in the selected bracket for each foot, the location of each receptacle corresponding to the location of each foot when the mixer-aerator device is in place upon the selected bracket.

3. The invention of claim 2 wherein each leg is unitary with the tubular body.

4. The invention of claim 2 wherein the lines extend in a longitudinal direction and the legs are located diametrically opposite to one another in a lateral direction, and extend in an altitudinal direction.

5. The invention of claim 4 wherein:

each foot includes at least one opening therein extending generally parallel to the longitudinal direction;

each receptacle includes at least one aperture therein extending generally parallel to the longitudinal direction and aligned with the opening in a corresponding foot; and the fastening means including at least one pin capable of selective insertion through said aperture and into said opening generally parallel to the longitudinal direction to secure each foot within a corresponding receptacle, and retaining means for retaining the pin in place within the aperture and the opening.

6. The invention of claim 5 including:

at least two laterally spaced openings in each foot;

at least two laterally spaced apertures in each receptacle; and ;p1 at least two pins to secure each foot within a corresponding receptacle.

7. The invention of claim 6 wherein:

the openings extend entirely through each foot;

the receptacles each include a pair of longitudinally spaced walls located so as to be juxtaposed with a corresponding foot;

the apertures extend through the longitudinally spaced walls; and each pin passes through a foot and a corresponding pair of walls, each generally parallel to the longitudinal direction to secure the foot within the corresponding receptacle.

8. The invention of claim 2 wherein the selected bracket includes:

a platform for supporting the line at the location of the selected bracket;

a pair of arms extending from the platform in laterally opposite directions, each receptacle being located upon one of said arms; and a plurality of depending supports extending in an altitudinal direction for supporting the platform and the receptacles, each depending support including a locating shoulder for locating the platform and the receptacles altitudinally relative to the basin.

9. The invention of claim 8 wherein a depending support is located beneath the platform and beneath each receptacle.

10. The invention of claim 9 including an anchoring projection integral with each depending support and extending altitudinally beneath the shoulder thereon so as to provide a permanent anchor for each support within the basin.

11. The invention of claim 9 wherein each depending support includes laterally extending portions for receiving anchoring means to provide a permanent anchor for each support within the basin.

12. The invention of claim 9 wherein the platform includes longitudinally extending portions for receiving the line-attaching means to attach the line at the location of the selected bracket to the selected bracket without modification of the line.

13. The invention of claim 12 wherein the platform has a line support surface having a surface contour including a plurality of cylindrical segments of different radii for supporting a line of any one of a plurality of different diameters.

14. A bracket for use in a system for the aerobic treatment of waste materials in a liquid basin, the system including gas distribution lines in an array of continuous lines having a plurality of orifices placed therein for releasing gas, such as air, to the liquid in the basin, a mixer-aerator device for placement in position over any one of the orifices for enhancing the mixing and aerating of the liquid in the region adjacent that position, and a plurality of such brackets placed in the basin in a pattern corresponding to the array of continuous lines, said bracket comprising:
  a platform extending in a longitudinal direction for supporting a line located at the position which will receive the mixer-aerator device;
  a pair of arms extending from the platform in laterally opposite directions;
  receptor means on each arm for receiving the mixer-aerator device secured in a rigid, self-supporting manner upon the base, said receptor means being capable of cooperation with the mixer-aerator device to preclude relative movement between the mixer-aerator device and the bracket; and
  a plurality of depending supports extending in an altitudinal direction for supporting the platform and the receptor means in fixed relationship relative to the basin.

15. The invention of claim 14 wherein the mixer-aerator device includes a tubular body having a top and an open bottom and at least two rigid legs depending from the bottom of the tubular body and being rigidly integral therewith, the legs extending in an altitudinal direction and being spaced apart laterally so as to enable the legs to straddle the line supported on the platform, each leg including a foot adjacent the lowermost end thereof:
  the receptor means including a receptacle on each arm for receiving a corresponding foot of the mixer-aerator device, and means in the receptacle for enabling selective securement of the corresponding foot within each receptacle in such manner as to preclude relative movement between each foot and the corresponding receptacle, and selective release of each foot from each receptacle.

16. The invention of claim 15 wherein each foot includes at least one opening therein extending generally parallel to the longitudinal direction:
  each receptacle including at least one aperture therein extending generally parallel to the longitudinal direction for alignment with the opening in a corresponding foot to enable the selective insertion of a pin through said aperture and into said opening generally parallel to the longitudinal direction to secure each foot within a corresponding receptacle.

17. The invention of claim 16 wherein each foot includes at least two laterally spaced apart openings therein:
  each receptacle including at least two laterally spaced apertures to enable the selective insertion of at least two pins each generally parallel to the longitudinal direction to secure each foot within a corresponding receptacle.

18. The invention of claim 17 wherein:
  the receptacles each include a pair of longitudinally spaced walls located so as to be juxtaposed with a corresponding foot; and
  the apertures extend through the longitudinally spaced walls.

19. The invention of claim 14 wherein each depending support includes a locating shoulder for locating the platform and the receptor means altitudinally relative to the basin.

20. The invention of claim 19 wherein a depending support is located beneath the platform and beneath each receptor means.

21. The invention of claim 20 including an anchoring projection integral with each depending support and extending altitudinally beneath the shoulder thereon so as to provide a permanent anchor for each support within the basin.

22. The invention of claim 20 wherein each depending support includes laterally extending portions for receiving anchoring means to provide a permanent anchor for each support within the basin.

23. The invention of claim 20 wherein the platform includes longitudinally extending portions for receiving line-attaching means to attach the line to the bracket without modification of the line.

24. The invention of claim 23 wherein the platform has a line-support surface having a surface contour including a plurality of cylindrical segments of different radii for supporting a line of any one of a plurality of different diameters.

* * * * *